US012776447B2

(12) United States Patent
Hong et al.

(10) Patent No.: US 12,776,447 B2
(45) Date of Patent: Oct. 27, 2026

(54) MULTILAYERED CAPACITOR

(71) Applicant: SAMSUNG ELECTRO-MECHANICS CO., LTD., Suwon-si (KR)

(72) Inventors: Hyukjin Hong, Suwon-si (KR); Kipyo Hong, Suwon-si (KR); Young-Hoon Song, Suwon-si (KR); Dongju Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 152 days.

(21) Appl. No.: 18/206,945

(22) Filed: Jun. 7, 2023

(65) Prior Publication Data

US 2024/0112859 A1 Apr. 4, 2024

(30) Foreign Application Priority Data

Sep. 30, 2022 (KR) ........................ 10-2022-0125183

(51) Int. Cl.
*H01G 4/30* (2006.01)
*H01G 4/005* (2006.01)
(Continued)

(52) U.S. Cl.
CPC ............. *H01G 4/005* (2013.01); *H01G 4/232* (2013.01); *H01G 4/248* (2013.01); *H01G 4/30* (2013.01)

(58) Field of Classification Search
None
See application file for complete search history.

(56) References Cited

U.S. PATENT DOCUMENTS 10,141,110 B2 * 11/2018 Park ....................... H01G 4/232
11,189,423 B2 * 11/2021 Kim ......................... H01G 4/30
(Continued)

FOREIGN PATENT DOCUMENTS

JP H09-260202 A 10/1997
JP H11-214244 A 8/1999
(Continued)

OTHER PUBLICATIONS

English Machine Translation of JP2000124057 (Year: 2000).*
(Continued)

*Primary Examiner* — Timothy J. Dole
*Assistant Examiner* — Esther N Lian
(74) *Attorney, Agent, or Firm* — Morgan, Lewis & Bockius LLP

(57) ABSTRACT

A multilayered capacitor includes a capacitor body including dielectric layers, a pair of first internal electrode layers with a first one of the dielectric layers interposed therebetween and a pair of second internal electrode layers stacked with a second one of the dielectric layers interposed therebetween, and a first external electrode and a second external electrode on both sides of the capacitor body in a longitudinal direction of the capacitor body. The pair of first internal electrode layers are respectively connected to the first external electrode and the second external electrode and the pair of second internal electrode layers are respectively connected to the first external electrode and the second external electrode. In a width direction of the capacitor body, an average length of the pair of first internal electrode layers and an average length of the pair of second internal electrode layers are different.

7 Claims, 15 Drawing Sheets

(51) Int. Cl.
*H01G 4/232* (2006.01)
*H01G 4/248* (2006.01)

(56) References Cited

U.S. PATENT DOCUMENTS

| | | | | |
|---|---|---|---|---|
| 2013/0135787 | A1 | 5/2013 | Lim et al. | |
| 2013/0208398 | A1 | 8/2013 | Tanaka et al. | |
| 2021/0257161 | A1* | 8/2021 | Yoshida | H01G 4/1218 |
| 2021/0366658 | A1* | 11/2021 | Yamato | H01G 4/1227 |
| 2021/0375548 | A1* | 12/2021 | Miyazaki | H01G 4/12 |

FOREIGN PATENT DOCUMENTS

| | | | | | |
|---|---|---|---|---|---|
| JP | H11-297566 | A | | 10/1999 | |
| JP | 2000-040634 | A | | 2/2000 | |
| JP | 2000124057 | A | * | 4/2000 | |
| JP | 5590055 | B2 | | 9/2014 | |
| JP | 2015188046 | A | * | 10/2015 | H01G 4/30 |
| KR | 20120133696 | A | * | 12/2012 | H01G 4/12 |
| KR | 10-1461753 | B1 | | 11/2014 | |

OTHER PUBLICATIONS

Extended European Search Report dated Jul. 17, 2024 issued in European Patent Application No. 23187247.4.
Office Action issued on Jan. 9, 2026 in Korean Patent Application No. 10-2022-0125183 with English translation.

* cited by examiner

MULTILAYERED CAPACITOR

CROSS-REFERENCE TO RELATED APPLICATION

This application claims priority to and the benefit of Korean Patent Application No. 10-2022-0125183 filed in the Korean Intellectual Property Office on Sep. 30, 2022, the entire contents of which are incorporated herein by reference.

TECHNICAL FIELD

This disclosure relates to a multilayered capacitor.

BACKGROUND

Multilayered capacitors are used in various electronic devices because they are small and have high capacity.

In particular, a high-voltage multilayered capacitor for an electric device for a vehicle is manufactured by applying a conductive paste onto a dielectric green sheet to form a printed film for an internal electrode and then, stacking the dielectric green sheet in several tens to hundreds of layers.

Herein, when a high voltage electric field is applied thereto, length expansion occurs in a thickness direction (electric field direction), but length contraction occurs in a width direction (reverse piezoelectric effect).

This phenomenon occurs because dipoles in a ferroelectric, for example, $BaTiO_3$, are aligned in one direction by the electric field, which is in a parallel direction to the electric field.

At this time, when a stress greater than a threshold value is applied to the multilayered capacitor, cracks may be generated. The occurrence of cracks due to this piezoelectric phenomenon can be particularly problematic in high-reliability products that have a high applied voltage, a high margin-to-overlap ratio, and a large and thick film.

Therefore, it is necessary to suppress the occurrence of cracks due to piezoelectric phenomenon in such high-reliability products.

SUMMARY

One aspect of the present disclosure provides a multilayered capacitor having a reduced initial failure by decreasing a stress at the interface between a margin portion in the width direction and the internal electrode, thereby alleviating a rapid stress rise between the margin portion in the width direction and the internal electrode interface and thereby delaying the occurrence of cracks due to the piezoelectric phenomenon.

A multilayered capacitor according to one aspect includes a capacitor body including dielectric layers, a pair of first internal electrode layers with a first one of the dielectric layers interposed therebetween and a pair of second internal electrode layers stacked with a second one of the dielectric layers interposed therebetween, and a first external electrode and a second external electrode on both sides of the capacitor body in a longitudinal direction of the capacitor body. The pair of first internal electrode layers are respectively connected to the first external electrode and the second external electrode and the pair of second internal electrode layers are respectively connected to the first external electrode and the second external electrode, and an average length, in a width direction of the capacitor body, of the pair of first internal electrode layers and an average length, in the width direction of the capacitor body, of the pair of second internal electrode layers are different.

The capacitor body may include a first surface and a second surface facing each other in a stacking direction of the pair of first internal electrode layers and the pair of second internal electrode layers; a third surface and a fourth surface connected to the first surface and second surface and facing each other in the longitudinal direction; and a fifth surface and a sixth surface connected to the first surface and the second surface, connected to the third surface and the fourth surface, and facing each other in the width direction.

The first external electrode is disposed on the third surface of the capacitor body.

The second external electrode is disposed on the fourth surface of the capacitor body.

The pair of first internal electrode layers may include a 1-1 internal electrode layer connected to the first external electrode and a 1-2 internal electrode layer connected to the second external electrode.

The pair of second internal electrode layers may include a 2-1 internal electrode layer connected to the first external electrode and a 2-2 internal electrode layer connected to the second external electrode.

The pair of first internal electrode layers and the pair of second internal electrode layers may be alternately stacked with a third one of the dielectric layers interposed therebetween.

The 1-1 internal electrode layer, the 1-2 internal electrode layer, the 2-1 internal electrode layer, and the 2-2 internal electrode layer may be sequentially stacked with a respective one of the dielectric layers interposed therebetween.

The average length in the width direction of the pair of first internal electrode layers may be longer than the average length in the width direction of the pair of second internal electrode layers.

A ratio of the average length in the width direction of the pair of first internal electrode layers to the average length in the width direction of the pair of second internal electrode layers may be about 0.7:1 to less than about 1:1.

An average length in the width direction of one end of the 1-1 internal electrode layer connected to the first external electrode may be shorter than an average length in the width direction of the other end of the 1-1 internal electrode layer not connected to the first external electrode.

An average length in the width direction of one end of the 1-2 internal electrode layer connected to the second external electrode may be shorter than an average length in the width direction of the other end of the 1-2 internal electrode layer not connected to the second external electrode.

An average length in the width direction of one end of the 2-1 internal electrode layer connected to the first external electrode may be shorter than an average length in the width direction of the other end of the 2-1 internal electrode layer not connected to the first external electrode.

An average length in the width direction of one end of the 2-2 internal electrode layer connected to the second external electrode may be shorter than an average length in the width direction of the other end of the 2-2 internal electrode layer not connected to the second external electrode.

An end portion closer to the fifth surface of the pair of first internal electrode layers may be closer to the fifth surface than an end portion closer to the fifth surface of the pair of second internal electrode layers.

An end portion closer to the sixth surface of the pair of first internal electrode layers may be closer to the sixth surface than an end portion closer to the sixth surface of the pair of second internal electrode layers.

An average shortest distance from an end closer to the fifth surface to the fifth surface of the pair of first internal electrode layers may be smaller than an average shortest distance from an end closer to the fifth surface to the fifth surface of the pair of second internal electrode layers.

The average shortest distance from the end closer to the sixth surface to the sixth surface of the first internal electrode layer may be smaller than the average shortest distance from the end closer to the sixth surface to the sixth surface of the second internal electrode layer.

A multilayered capacitor according to another aspect includes a capacitor body including dielectric layers, and a pair of first internal electrode layers with a first one of the dielectric layers interposed therebetween and a pair of second internal electrode layers stacked with a second one of the dielectric layers interposed therebetween, and a first external electrode and a second external electrode on both sides of the capacitor body in a longitudinal direction of the capacitor bod. The pair of first internal electrode layers are respectively connected to the first external electrode and the second external electrode and the pair of second internal electrode layers are respectively connected to the first external electrode and the second external electrode, the capacitor body has fifth and sixth surfaces opposite to each other in the width direction, an end portion closer to the fifth surface of the pair of first internal electrode layers is closer to the fifth surface than an end portion closer to the fifth surface of the pair of second internal electrode layers, and an end portion closer to the sixth surface of the pair of second internal electrode layers is closer to the sixth surface than an end portion closer to the sixth surface of the pair of first internal electrode layers.

The capacitor body may include a first surface and a second surface facing each other in a stacking direction of the pair of first internal electrode layers and the pair of second internal electrode layers; a third surface and a fourth surface connected to the first surface and second surface and facing each other in the longitudinal direction; and the fifth surface and the sixth surface connected to the first surface and the second surface, connected to the third surface and the fourth surface, and facing each other in the width direction.

The first external electrode may be disposed on the third surface of the capacitor body.

The second external electrode may be disposed on the fourth surface of the capacitor body.

The pair of first internal electrode layers and the pair of second internal electrode layers may be alternately stacked with a third one of the dielectric layers interposed therebetween.

The pair of first internal electrode layers may include a 1-1 internal electrode layer connected to the first external electrode and a 1-2 internal electrode layer connected to the second external electrode.

The pair of second internal electrode layers may include a 2-1 internal electrode layer connected to the first external electrode and a 2-2 internal electrode layer connected to the second external electrode.

An average length in the width direction of one end of the 1-1 internal electrode layer connected to the first external electrode may be shorter than an average length in the width direction of the other end of the 1-1 internal electrode layer not connected to the first external electrode.

An average length in the width direction of one end of the 1-2 internal electrode layer connected to the second external electrode may be shorter than an average length in the width direction of the other end of the 1-2 internal electrode layer not connected to the second external electrode.

An average length in the width direction of one end of the 2-1 internal electrode layer connected to the first external electrode may be shorter than an average length in the width direction of the other end of the 2-1 internal electrode layer not connected to the first external electrode.

An average length in the width direction of one end of the 2-2 internal electrode layer connected to the second external electrode may be shorter than an average length in the width direction of the other end of the 2-2 internal electrode layer not connected to the second external electrode.

An average shortest distance from an end closer to the fifth surface to the fifth surface of the pair of first internal electrode layers may be smaller than an average shortest distance from an end closer to the fifth surface to the fifth surface of the pair of second internal electrode layers.

An average shortest distance from an end closer to the sixth surface to the sixth surface of the pair first internal electrode layers may be greater than an average shortest distance from an end closer to the fifth surface to the sixth surface of the pair of second internal electrode layers.

According to the multilayered capacitor according to one aspect, an initial failure may be reduced by decreasing a stress at the interface between the margin portion in the width direction and the internal electrode, thereby alleviating a rapid stress rise between the margin portion in the width direction and the internal electrode interface and thereby delaying the occurrence of cracks due to the piezoelectric phenomenon.

Figure 1:
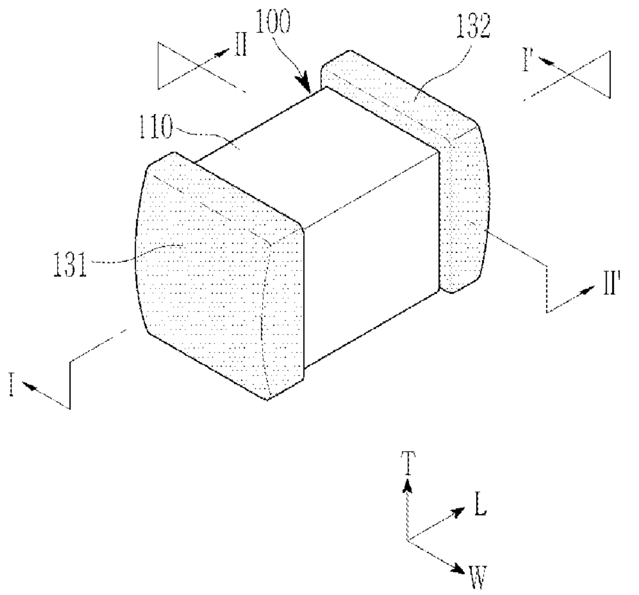
FIG. 1 is a perspective view illustrating a multilayered capacitor according to an embodiment.

of the multilayered capacitors manufactured in Examples 1 and 2, Comparative Examples 1 and 2, and Reference Example 1.

DETAILED DESCRIPTION

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
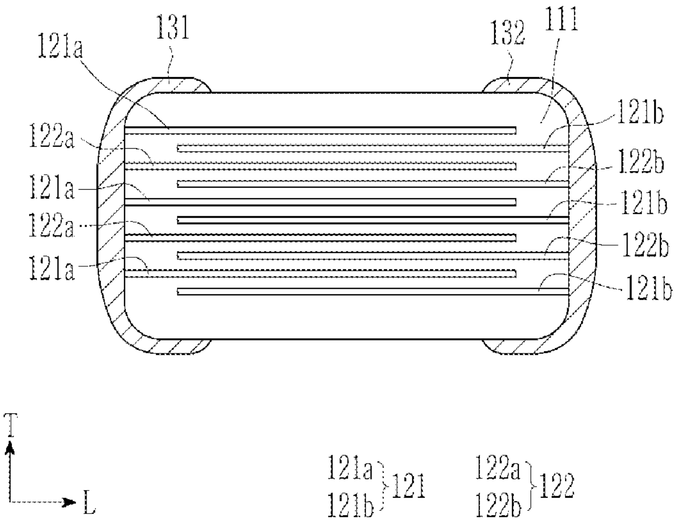
FIG. 2 is a cross-sectional view of the multilayered capacitor taken along line I-I' of FIG. 1.
Figure 3:
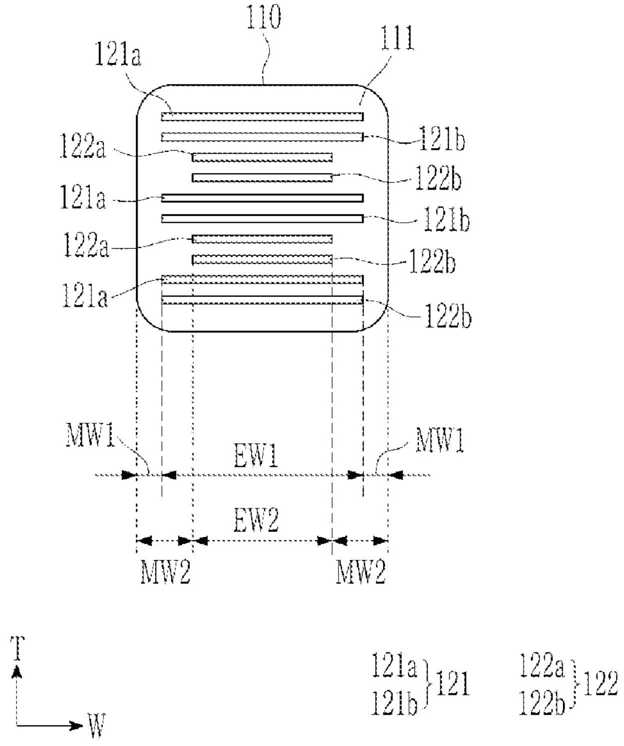
FIG. 3 is a cross-sectional view of the multilayered capacitor taken along line II-II' of FIG. 1.
Figure 4:
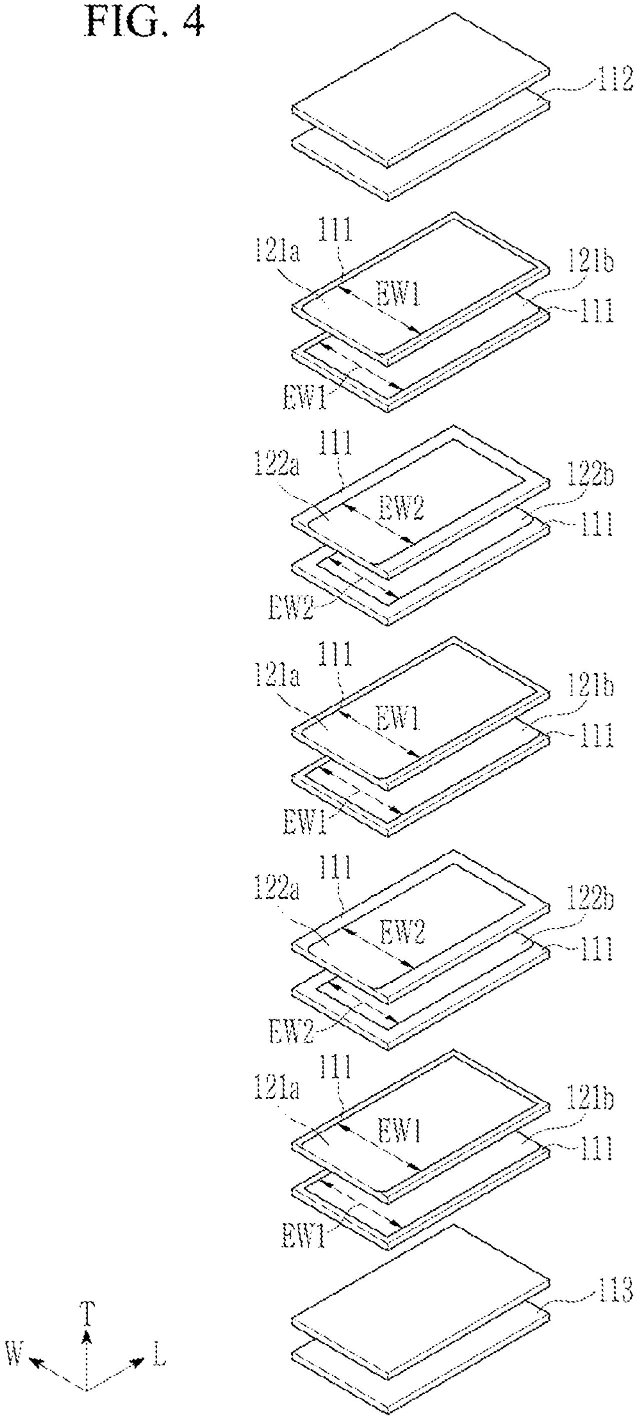
FIG. 4 is an exploded perspective view illustrating a stacked structure of internal electrode layers in the capacitor body of FIG. 1.
Figure 5:
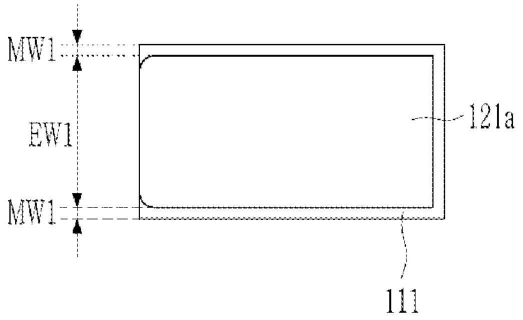
FIG. 5 is a plan view illustrating the 1-1 internal electrode layer of FIG. 4.
Figure 6:
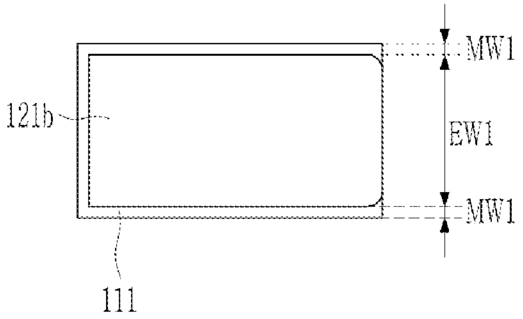
FIG. 6 is a plan view illustrating the 1-2 internal electrode layer of FIG. 4.
Figure 7:
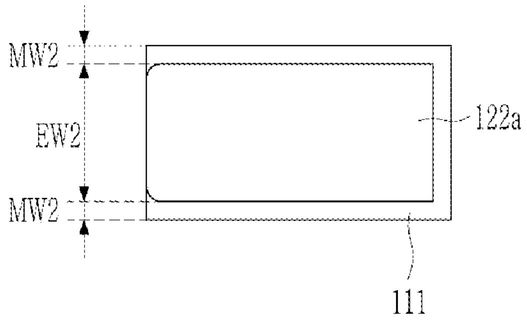
FIG. 7 is a plan view illustrating a 2-1 internal electrode layer of FIG. 4.
Figure 8:
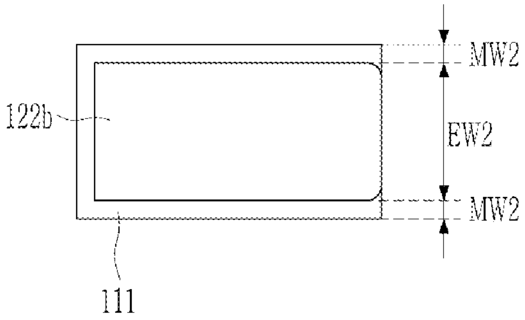
FIG. 8 is a plan view illustrating a 2-2 internal electrode layer of FIG. 4.

FIG. 1 is a perspective view illustrating a multilayered capacitor 100 according to an embodiment, FIG. 2 is a cross-sectional view of the multilayered capacitor 100 taken along line I-I' of FIG. 1, FIG. 3 is a cross-sectional view of the multilayered capacitor 100 taken along the line II-II' of FIG. 1, FIG. 4 is an exploded perspective view illustrating the stacked structure of the internal electrode layers in the capacitor body 110 of FIG. 1, FIG. 5 is a plan view showing the 1-1 internal electrode layer of FIG. 4, FIG. 6 is a plan view showing the 1-2 internal electrode layer of FIG. 4, FIG. 7 is a plan view illustrating the 2-1 internal electrode layer of FIG. 4, and FIG. 8 is a plan view illustrating the 2-2 internal electrode layer of FIG. 4.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first external electrode 131 and the second external electrode 132 are disposed. The width direction (W-axis direction) may be a direction that extends parallel to the wide surface (main surface) of the sheet-shaped components and is substantially perpendicular to the thickness direction (T-axis direction) and the longitudinal direction (L-axis direction), and may be, for example, a direction in which the first external electrode 131 and the second external electrode 132 are not positioned on both sides.

Referring to FIGS. 1 to 8, the multilayered capacitor 100 according to the present embodiment may include the capacitor body 110 and a first external electrode 131 and a second external electrode 132 disposed at both sides of the capacitor body 110 which face each other in the L direction.

The capacitor body 110 may have, for example, a substantially hexahedral shape.

In this embodiment, for convenience of explanation, in the capacitor body 110, both surfaces opposite to each other in the thickness direction (T-axis direction) are defined as a first surface and a second surface, both surfaces connected to the first surface and the second surface and facing each other in the longitudinal direction (L-axis direction) are defined as a third surface and a fourth surface, and both surfaces connected to the first surface and the second surface, connected to the third surface and the fourth surface, and facing each other in the width direction (W-axis direction) are defined as a fifth surface and a sixth surface. The first surface, which is a bottom surface, may be a surface facing a mounting direction.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the T direction and then sintering them, and includes a plurality of dielectric layers 111 and a pair of first internal electrode layers 121 and a pair of second internal electrode layers 122 which are alternately disposed in a thickness direction (T-axis direction) with the dielectric layers 111 interposed therebetween. In this case, the pair of first internal electrode layers 121 may have different polarities, and the pair of second internal electrode layers 122 may have different polarities.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating capacitance of the multilayered capacitor 100. For example, the active region may be a region in which a pair of first internal electrode layers 121 or a pair of second internal electrode layers 122 are stacked and overlapped with each other along the thickness direction (T-axis direction).

The cover regions 112 and 113 may be respectively disposed on the first surface and second surface of the active region in the thickness direction (T-axis direction) as margin portions in the thickness direction. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion in the width direction, and may be respectively disposed on the fifth surface and the sixth surface of the active region in the width direction (W-axis direction). Such a side cover region may be formed by applying a conductive paste layer for forming internal electrode layers on the surface of the dielectric green sheet only to a portion of the surface of the dielectric green sheet, stacking dielectric green sheets to which a conductive paste layer is not applied, on both side surfaces of the dielectric green sheet, and sintering the same.

The cover regions 112 and 113 and the side cover regions serve to prevent damage to the first internal electrode layer 121 and the second internal electrode layer 122 due to physical or chemical stress.

For example, the dielectric layer 111 may include a ceramic material with a high dielectric constant. For example, the ceramic material may include a dielectric ceramic including a component such as $BaTiO_3$, $CaTiO_3$, $SrTiO_3$, $CaZrO_3$, or the like. Further, in addition to these components, auxiliary components such as a Mn compound, an Fe compound, a Cr compound, a Co compound, a Ni compound, and the like may be further included. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which Ca and Zr are partially dissolved in a $BaTiO_3$-based dielectric ceramic may be included.

In addition, in the dielectric layer 111, a ceramic additive, an organic solvent, a plasticizer, a binder, a dispersing agent, and the like along with the ceramic powder may be further added. The ceramic additive may be, for example, a transition metal oxide or a transition metal carbide, a rare earth element, magnesium (Mg), aluminum (Al), or the like.

For example, the dielectric layer 111 may have an average thickness of about 0.5 μm to about 10 μm.

The pair of first internal electrode layers 121 include a 1-1 internal electrode layer 121*a* and a 1-2 internal electrode layer 121*b* which are electrodes having different polarities, and are disposed to be overlapped with each other in the thickness direction (T-axis direction) with the dielectric layer 111 interposed therebetween. One end of the 1-1 internal electrode layer 121*a* in the longitudinal direction (L-axis direction) is exposed through (or is in contact with or extends from) the third surface of the capacitor body 110 and one end of the 1-2 internal electrode layer 121*b* in the longitudinal direction (L-axis direction) may be exposed through (or is in contact with or extends from) the fourth surface of the capacitor body 110.

The 1-1 internal electrode layer 121*a* and the 1-2 internal electrode layer 121*b* may be electrically insulated from each other by the dielectric layer 111 disposed therebetween.

An end of the 1-1 first internal electrode layer 121*a* exposed through the third surface of the capacitor body 110 may be electrically connected to the first external electrode 131 and an end of the 1-2 internal electrode layer 121*b* exposed through the fourth surface of the capacitor body 110 may be electrically connected to the second external electrode 132.

Similarly, the pair of second internal electrode layers 122 include a 2-1 internal electrode layer 122*a* and a 2-2 internal electrode layer 122*b* which are electrodes having different polarities, and are disposed to be overlapped with each other in the thickness direction (T-axis direction) with the dielectric layer 111 interposed therebetween. One end of the 2-1 internal electrode layer 122*a* in the longitudinal direction (L-axis direction) is exposed through (or is in contact with or extends from) the third surface of the capacitor body 110 and one end of the 2-2 internal electrode layer 122*b* in the longitudinal direction (L-axis direction) is exposed through (or is in contact with or extends from) the fourth surface of the capacitor body 110.

The 2-1 internal electrode layer 122*a* and the 2-2 internal electrode layer 122*b* may be electrically insulated from each other by the dielectric layer 111 disposed therebetween.

An end of the 2-1 internal electrode layer 122*a* exposed through the third surface of the capacitor body 110 may be electrically connected to the first external electrode 131 and an end of the 2-2 internal electrode layer 122*b* exposed through the fourth surface of the capacitor body 110 may be electrically connected to the second external electrode 132.

The pair of first internal electrode layers 121 and the pair of second internal electrode layers 122 may be alternately stacked along the thickness direction (T-axis direction) with the dielectric layer 111 interposed therebetween. For example, the 1-1 internal electrode layer 121*a*, the 1-2 internal electrode layer 121*b*, the 2-1 internal electrode layer 122*a*, and the 2-2 internal electrode layer 122*b* may be stacked sequentially with the dielectric layers 111 interposed therebetween.

At this time, an end of the 1-1 internal electrode layer 121*a* and an end of the 2-1 internal electrode layer 122*a* are exposed through the third surface of the capacitor body 110 to be electrically connected to the first external electrode 131 and an end of the 1-2 internal electrode layer 121*b* and an end of the 2-2 internal electrode layer 122*b* are exposed through the fourth surface of the capacitor body 110 to be electrically connected to the second external electrode 132.

The first internal electrode layer 121 and the second internal electrode layer 122 may include a conductive metal, for example, a metal such as Ni, Cu, Ag, Pd, or Au or an alloy thereof, for example, an Ag—Pd alloy.

Also, the first internal electrode layer 121 and the second internal electrode layer 122 may include dielectric particles having the same composition as the ceramic material included in the dielectric layer 111.

For example, each average thickness of the first internal electrode layer 121 and the second internal electrode layer 122 may be about 0.1 μm to about 2 μm.

According to the above configuration, when a predetermined voltage is applied to the first external electrode 131 and the second external electrode 132, charges are accumulated between a pair of first internal electrode layers 121 and a pair of second internal electrode layers 122. Herein, capacitance of the multilayered capacitor 100 is proportional to an overlapped area of the pair of first internal electrode layers 121 and the pair of second internal electrode layers 122 stacked along the thickness direction (T-axis direction) in the active region.

However, in the case of the high-reliability multilayered capacitor 100, the capacitor body 110 is formed by stacking the first internal electrode layer 121 and the second internal electrode layer 122 by tens to hundreds of layers. In this case, cracks are likely to occur due to piezoelectric phenomenon.

In order to improve the crack due to the tensile stress of the margin portion in the width direction, ae strength of the margin portion in the width direction may be increased by increasing the length in the width direction of the margin portion. However, when the length in the width direction of the margin portion increases, there is a problem in that the capacity is reduced by reducing the active region. When the length in the width direction of the margin portion increases, the decrease in capacity becomes larger, and thus it is difficult to apply to the high-capacity multilayered capacitor 100.

In the multilayered capacitor 100 according to the present embodiment, an average length EW1 in the width direction (W-axis direction) of the pair of first internal electrode layers 121 and an average length EW2 in the width direction (W-axis direction) of the pair of second internal electrode layers 122 are different from each other.

Thereby, by reducing a stress at the interface between a margin portion in the width direction (W-axis direction) and the internal electrode, and alleviating a rapid stress rise between the margin portion in the width direction (W-axis direction) and the internal electrode interface surface, crack generation due to piezoelectric phenomenon may be delayed and initial failures may be reduced.

For example, an average length EW1 in the width direction (W-axis direction) of the first internal electrode layer 121 may be longer than an average length EW2 in the width direction (W-axis direction) of the second internal electrode layer 122. For example, average lengths EW1 in the width direction (W-axis direction) of the 1-1 internal electrode layer 121*a* and the 1-2 internal electrode layer 121*b* may be longer than the average lengths EW2 in the width direction (W-axis direction) of the 2-1 internal electrode layer 122*a* and the 2-2 internal electrode layer 122*b*.

Herein, a length in the width direction (W-axis direction) of the first internal electrode layer 121 may be obtained by polishing a W-T plane along the L-axis direction until the first internal electrode layer 121 is exposed, selecting arbitrary first internal electrode layer 121 from the exposed cut surface, and determining a length of the shortest line segment connecting one end to the other end of the first internal electrode layer 121 in the width direction (W-axis direction) to be the length in the width direction (W-axis direction) of the first internal electrode layer 121. The length in the width direction (W-axis direction) of the first internal electrode layer 121 may be obtained by measuring an average length in the width direction (W-axis direction) of the 1-1 internal electrode layer 121*a* or the 1-2 internal electrode layer 121*b*.

The average length EW1 in width direction (W-axis direction) of the first internal electrode layer 121 may be an arithmetic mean value of lengths in the width direction (W-axis direction) of the first internal electrode layers 121 measured in selected arbitrary 3, 5, or 10 different first internal electrode layers 121 in the exposed cut surfaces. Alternatively, the average length EW1 in width direction (W-axis direction) of the first internal electrode layer 121 may be an arithmetic mean value of lengths in the width direction (W-axis direction) of the first internal electrode layers 121 measured for the same first internal electrode layers 121 in arbitrary 3, 5, or 10 different cut surfaces.

The average length EW2 in the width direction (W-axis direction) of the second internal electrode layer 122 may be obtained in the same manner as the average length in the width direction (W-axis direction) of the first internal electrode layer 121. The length of the second internal electrode layer 122 in the width direction (W-axis direction) may be obtained by measuring an average length in the width direction (W-axis direction) of the 2-1 internal electrode layer 122*a* or the 2-2 internal electrode layer 122*b*.

A ratio of the average length EW1 in the width direction (W-axis direction) of the first internal electrode layer 121 to the average length EW2 in the width direction (W-axis direction) of the second internal electrode layer 122 may be about 0.7:1 to less than about 1:1:1.

When the ratio of the average length EW1 in the width direction (W-axis direction) of the first internal electrode layer 121 to the average length EW2 in the width direction (W-axis direction) of the second internal electrode layer 122 is out of the above range, capacity reduction may be large.

For example, an average length in the width direction (W-axis direction) of one end of the 1-1 internal electrode layer 121*a* connected to the first external electrode 131 may be shorter than an average length in the width direction (W-axis direction) of the other end of the 1-1 internal electrode layer 121*a* not connected to the first external electrode 131. That is, the average length in the width direction (W-axis direction) of one end close to the third surface of the 1-1 internal electrode layer 121*a* may be shorter than the average length in the width direction (W-axis direction) of one end close to the fourth surface. For example, the average length in the width direction (W-axis direction) of the 1-1 internal electrode layer 121*a* is generally constant in the longitudinal direction (L-axis direction), but the average length in the width direction (W-axis direction) from one end of the 1-1 internal electrode layer 121*a* connected to the first external electrode 131 may be gradually decreased.

An average length in the width direction (W-axis direction) of one end of the 1-2 internal electrode layer 121*b* connected to the second external electrode 132 may be shorter than an average length in the width direction (W-axis direction) of the other end of the 1-2 internal electrode layer 121*b* not connected to the second external electrode 132. That is, the average length in the width direction (W-axis direction) of one end close to the fourth surface of the 1-2 internal electrode layer 121*b* may be shorter than the average length in the width direction (W-axis direction) of one end close to the third surface. For example, the average length in the width direction (W-axis direction) of the 1-2 internal electrode layer 121*b* is generally constant in the longitudinal direction (L-axis direction), but the average length in the width direction (W-axis direction) from one end of the 1-2 internal electrode layer 121*b* connected to the second external electrode 132 may be gradually decreased.

Similarly, the average length in the width direction (W-axis direction) of one end of the 2-1 internal electrode layer 122*a* connected to the first external electrode 131 may be shorter than the average length in the width direction (W-axis direction) of the other end of the 2-1 internal electrode layer 122*a* not connected to the first external electrode 131. That is, the average length in the width direction (W-axis direction) of one end close to the third surface of the 2-1 internal electrode layer 122*a* may be shorter than the average length in the width direction (W-axis direction) of one end close to the fourth surface. For example, the average length in the width direction (W-axis direction) of the 2-1 internal electrode layer 122*a* is generally constant in the longitudinal direction (L-axis direction), but the average length in the width direction (W-axis direction) from one end of the 2-1 internal electrode layer 122*a* connected to the first external electrode 131 may be gradually decreased.

The average length in the width direction (W-axis direction) of one end of the 2-2 internal electrode layer 122*b* connected to the second external electrode 132 may be shorter than the average length in the width direction (W-axis direction) of the other end of the 2-2 internal electrode layer 122*b* not connected to the second external electrode 132. That is, the average length in the width direction (W-axis direction) of one end close to the fourth surface of the 2-2 internal electrode layer 122*b* may be shorter than the average length in the width direction (W-axis direction) of one end close to the third surface. For example, the average length in the width direction (W-axis direction) of the 2-2 internal electrode layer 122*b* is generally constant in the longitudinal direction (L-axis direction), but the average length in the width direction (W-axis direction) from one end of the 2-2 internal electrode layer 122*b* connected to the second external electrode 132 may be gradually decreased.

Accordingly, by reducing the stress at the interface with the external electrode, and alleviating the rapid stress rise at the interface with the external electrode, the crack generation due to the piezoelectric phenomenon is delayed, so that the initial failure may be reduced.

An end portion closer to the fifth surface of the pair of first internal electrode layers 121 may be disposed closer to the fifth surface than an end portion closer to the fifth surface of the pair of second internal electrode layers 122.

In addition, an end portion closer to the sixth surface of the pair of first internal electrode layers 121 may be disposed closer to the sixth surface than an end portion closer to the sixth surface of the pair of second internal electrode layers 122.

Accordingly, the average length MW1 in the width direction (W-axis direction) of the margin portion of the first internal electrode layer 121 may be smaller than the average length MW2 in the width direction (W-axis direction) of the margin portion of the second internal electrode layer 122.

Herein, the length in the width direction (W-axis direction) of the margin portion of the first internal electrode layer 121 may be the shortest distance from one end of the first internal electrode layer 121 in the width direction (W-axis direction) to one surface (fifth surface) of the capacitor body 110 in the width direction (W-axis direction).

The length in the width direction (W-axis direction) of the margin portion of the second internal electrode layer 122 may be the shortest distance from one end of the second internal electrode layer 122 in the width direction (W-axis direction) to one surface (fifth surface) of the capacitor body 110 in the width direction (W-axis direction).

Or, the length in the width direction (W-axis direction) of the margin portion of the first internal electrode layer 121 may be the shortest distance from the other end of the first internal electrode layer 121 in the width direction (W-axis direction) to the other surface (sixth surface) of the capacitor body 110 in the width direction (W-axis direction).

The length in the width direction (W-axis direction) of the margin portion of the second internal electrode layer 122 may be the shortest distance from the other end of the second internal electrode layer 122 in the width direction (W-axis direction) to the other surface (sixth surface) of the capacitor body 110 in the width direction (W-axis direction).

The length in the width direction (W-axis direction) of the margin portion of the first internal electrode layer 121 may be obtained by polishing a W-T plane along the L-axis direction until the first internal electrode layer 121 is exposed, selecting arbitrary first internal electrode layer 121 from exposed cut surface, extending the shortest line segment connecting one end and the other end of the first internal electrode layer 121 in the width direction (W-axis direction) to one surface (fifth surface) of the capacitor body 110 in the width direction (W-axis direction), and measuring a distance between one end of the first internal electrode layer 121 in the width direction (W-axis direction) and one surface (fifth surface) in the width direction (W-axis direction) of the capacitor body 110 in the line segment or by measuring a distance between the other end of the first internal electrode layer 121 in the width direction (W-axis direction) and the other surface (sixth surface) of the capacitor body 110 in the width direction (W-axis direction) in the line segment.

The average length MW1 in the width direction (W-axis direction) of the margin portion of first internal electrode layer 121 may be an arithmetic mean value of lengths in the width direction (W-axis direction) of the margin portions of the first internal electrode layer 121 measured in selected arbitrary 3, 5, or 10 different first internal electrode layers 121 in the exposed cut surfaces. Alternatively, the average length MW1 in the width direction (W-axis direction) of the margin portion of first internal electrode layer 121 may be an arithmetic mean value of lengths in the width direction (W-axis direction) of the margin portions of the first internal electrode layer 121 measured for the same first internal electrode layers 121 in arbitrary 3, 5, or 10 different cut surfaces.

The average length MW2 of the margin portions in the width direction (W-axis direction) of the second internal electrode layer 122 may be obtained in the same manner as the average length MW1 of the margin portions in the width direction (W-axis direction) of the first internal electrode layer 121.

The first external electrode 131 and the second external electrode 132 may be provided with voltages having different polarities and electrically connected to the exposed portions of the first external electrode 131 and the second internal electrode layer 122, respectively.

The first external electrode 131 and the second external electrode 132 may respectively include a first connection portion and a second connection portion disposed on the third surface and the fourth surface of the capacitor body 110 and connected to the first internal electrode layer 121 and the second internal electrode layer 122, and may also include a first band portion and a second band portion disposed at each corner where the first surface and the second surface of the capacitor body 110 and the third surface and the fourth surface thereof meet.

The first band portion and the second band portion may extend from the first connection portion and the second connection portion to portions of the first surface and second surface of the capacitor body 110, respectively. The first band portion and the second band portion may respectively further extend from the first connection portion and the second connection portion to the portions of the fifth surface and the sixth surface of the capacitor body 110. The first band portion and the second band portion may serve to improve adhesion strength of the first external electrode 131 and the second external electrode 132.

For example, the first external electrode 131 and the second external electrode 132 may respectively include a first base electrode and a second base electrode in contact with the capacitor body 110, and a first terminal electrode and a second terminal electrode configured to cover the first base electrode and the second base electrode, respectively.

The first base electrode and the second base electrode may include copper (Cu). In addition, the first base electrode and the second base electrode may include copper (Cu) as a main component, one or more materials of nickel (Ni), tin (Sn), palladium (Pd), platinum (Pt), gold (Au), silver (Ag), tungsten (W), titanium (Ti), lead (Pb), or an alloy thereof, and glass.

For example, the first base electrode and the second base electrode may be formed in a method of dipping the capacitor body 110 in a conductive paste including a conductive metal and glass, printing the conductive paste on the surface of the capacitor body 110 through screen printing, gravure printing, or the like, and applying the conductive paste onto the surface of the capacitor body 110 or transferring a dry film formed by drying the conductive paste onto the capacitor body 110.

The first terminal electrode and the second terminal electrode are formed of the aforementioned conductive paste and thus may increase density of the first external electrode 131 and the second external electrode 132 due to the glass added thereto as well as maintain sufficient conductivity, and thereby effectively suppress penetration of a plating solution and/or external moisture.

For example, the glass component included in the first terminal electrode and the second terminal electrode may have a composition in which oxides are mixed, and the metal oxides may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni), the alkali metal may be at least one selected from lithium (Li), sodium (Na), and potassium (K), and the alkaline earth metal may be at least one selected from magnesium (Mg), calcium (Ca), strontium (Sr), and barium (Ba).

For example, the first terminal electrode and the second terminal electrode may include nickel (Ni) as a main component, and may further include copper (Cu), tin (Sn), palladium (Pd), platinum (Pt), gold (Au), silver (Ag), tungsten (W), titanium (Ti), or lead (Pb) alone or as alloy thereof. The first terminal electrode and the second terminal electrode may improve mountability of the multilayered capacitor 100 on a board, structural reliability, external durability, heat resistance, and equivalent series resistance (ESR).

For example, the first terminal electrode and the second terminal electrode may be formed through plating. The first terminal electrode and the second terminal electrode may be formed through sputtering or electroplating (electric deposition).

Figure 9:
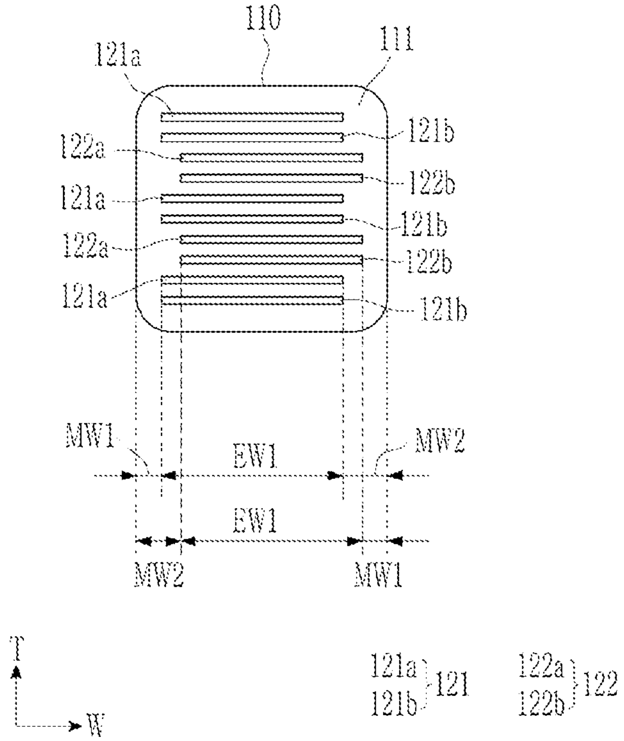
FIG. 9 is a cross-sectional view taken along a line II-II' of a multilayered capacitor according to another embodiment.
Figure 10:
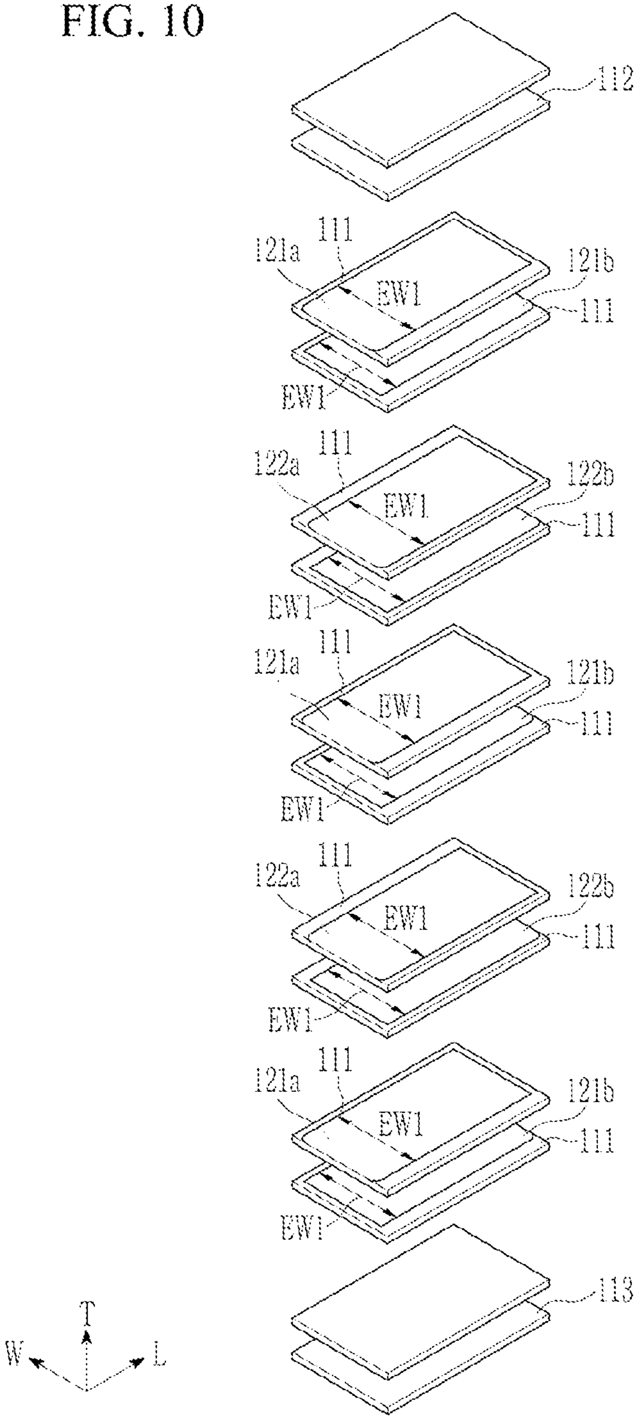
FIG. 10 is an exploded perspective view illustrating a stacked structure of the internal electrode layers in the capacitor body of FIG. 9.
Figure 11:
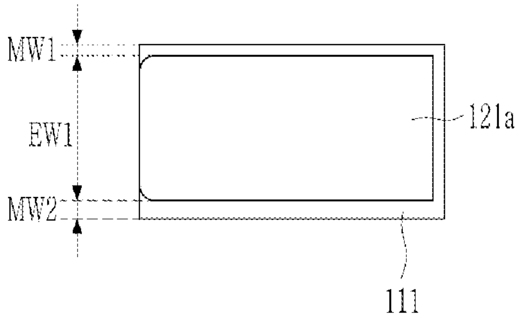
FIG. 11 is a plan view illustrating a 1-1 internal electrode layer of FIG. 10.
Figure 12:
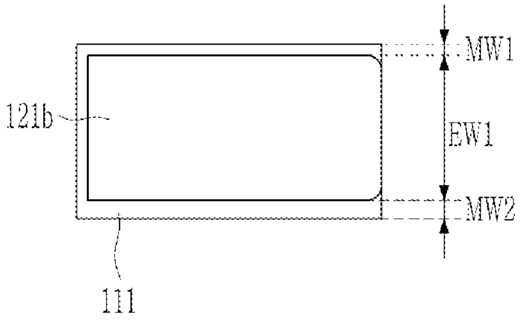
FIG. 12 is a plan view illustrating the 1-2 internal electrode layer of FIG. 10.
Figure 13:
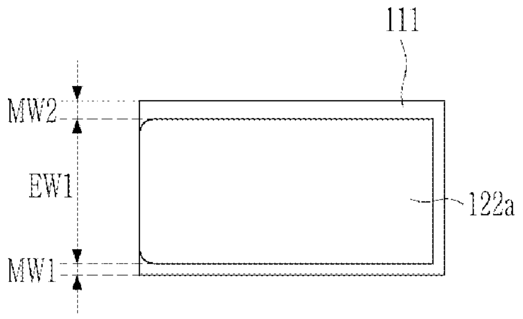
FIG. 13 is a plan view illustrating a 2-1 internal electrode layer of FIG. 10.
Figure 14:
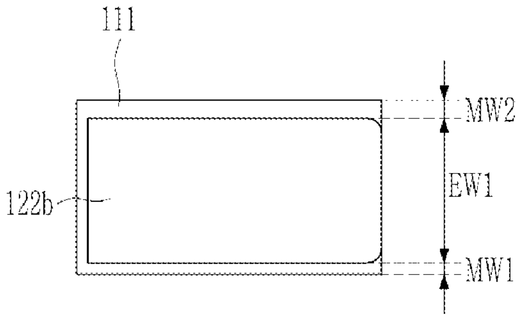
FIG. 14 is a plan view illustrating a 2-2 second internal electrode layer of FIG. 10.

FIG. 9 is a cross-sectional view of a multilayered capacitor 100 according to another embodiment taken along line II-II' of FIG. 1, FIG. 10 is an exploded perspective view illustrating a stacked structure of internal electrode layers in the capacitor body 110 of FIG. 9, FIG. 11 is a plan view illustrating the 1-1 internal electrode layer of FIG. 10, FIG. 12 is a plan view illustrating the 1-2 internal electrode layer of FIG. 10, FIG. 13 is a plan view illustrating the 2-1 internal electrode layer of FIG. 10, and FIG. 14 is a plan view illustrating the 2-2 internal electrode layer of FIG. 10.

A perspective view of the multilayered capacitor 100 according to another embodiment is the same as that of FIG. 1, and a cross-sectional view taken along the line I-I' of FIG. 1 is the same as that of FIG. 2.

Since the electronic component according to the present embodiment is similar to the aforementioned electronic component, overlapped descriptions will be omitted, and differences will be mainly described.

In the multilayered capacitor 100 according to the present embodiment, an end portion closer to the fifth surface of the pair of first internal electrode layers 121 may be disposed closer to the fifth surface than an end portion closer to the fifth surface of the pair of second internal electrode layers 122.

However, the end portion closer to the sixth surface may be located closer to the sixth surface of the pair of second internal electrode layers 122 than the end portion closer to the sixth surface of the pair of first internal electrode layers 121.

Accordingly, the average length MW1 of the margin portions of the first internal electrode layer 121 close to the fifth surface may be smaller than the average length MW2 of the margin portions of the second internal electrode layer 122 close to the fifth surface, and the average length MW2 of the margin portions of the first internal electrode layer 121 close to the sixth surface may be larger than the average length MW1 of the margin portions of the second internal electrode layer 122 close to the sixth surface.

Herein, the length of the margin portion of the first internal electrode layer 121 close to the fifth surface may be the shortest distance from one end of the first internal electrode layer 121 close to the fifth surface of the capacitor body 110.

The length of the margin portion of the second internal electrode layer 122 close to the fifth surface may be the shortest distance from one end of the second internal electrode layer 122 close to the fifth surface of the capacitor body 110. The length of the margin portion of the first internal electrode layer 121 close to the sixth surface may be the shortest distance from one end of the first internal electrode layer 121 to the sixth surface of the capacitor body 110.

The length of the margin portion of the second internal electrode layer 122 close to the sixth surface may be the shortest distance from one end of the second internal electrode layer 122 to the sixth surface of the capacitor body 110.

The length of the margin portion close to the fifth surface of the first internal electrode layer 121 may be obtained by polishing a W-T plane along the L-axis direction until the first internal electrode layer 121 is exposed, selecting an arbitrary first internal electrode layer 121 from the exposed cut surface, extending the shortest line segment connecting the end close to the fifth surface and the sixth surface of the first internal electrode layer 121 to the fifth surface of the capacitor body 110, and measuring a distance between the end of the line segment close to the fifth surface of the first internal electrode layer 121 and the fifth surface of the capacitor body 110. The length of the margin portion of the first internal electrode layer 121 may be obtained by measuring the length of the margin portion of the 1-1 internal electrode layer 121*a* or the 1-2 internal electrode layer 121*b*.

The length of the margin portion of the first internal electrode layer 121 close to the sixth surface may be obtained by extending the aforementioned line segment to the sixth surface of the capacitor body 110 and measuring a distance between one end of the first internal electrode layer 121 close to the sixth surface and the sixth surface of the capacitor body 110 on the line segment.

The average length MW1 of the margin portions close to the fifth surface of the first internal electrode layer 121 may be an arithmetic mean value of the lengths of the margin portions closer to the fifth surface of the internal electrode layer 121 measured in selected arbitrary 3, 5, or 10 different first internal electrode layers 121 in the exposed cut surfaces. Alternatively, the average length MW1 of the margin portions close to the fifth surface of the first internal electrode layer 121 may be an arithmetic mean value of lengths of the margin portions closer to the fifth surface of the first internal electrode layer 121 measured for the same first internal electrode layer 121 in arbitrary 3, 5, or 10 different cut surfaces.

The average length MW2 of the margin portions close to the sixth surface of the first internal electrode layer 121 may be an arithmetic mean value of the lengths of the margin portions closer to the sixth surface of the internal electrode layer 121 measured in selected arbitrary 3, 5, or 10 different first internal electrode layers 121 in the exposed cut surfaces. Alternatively, the average length MW2 of the margin portions close to the sixth surface of the first internal electrode layer 121 may be an arithmetic mean value of lengths of the margin portions closer to the sixth surface of the first internal electrode layer 121 measured for the same first internal electrode layer 121 in arbitrary 3, 5, or 10 different cut surfaces.

The average length MW2 of the margin portions closer to the fifth surface of the second internal electrode layer 122 may be obtained in the same manner as the average length MW1 of the margin portions closer to the fifth surface of the first internal electrode layer 121, and the average length MW1 of the margin portions closer to the sixth surface of the second internal electrode layer 122 may be obtained in the same manner as the average length MW2 of the margin portions closer to the sixth surface of the first internal electrode layer 121. The length of the margin portion of the second internal electrode layer 122 may be obtained by measuring the length of the margin portion of the 2-1 internal electrode layer 122*a* or the 2-2 internal electrode layer 122*b*.

In this case, the average length EW1 in the width direction (W-axis direction) of the pair of first internal electrode layers 121 and the average length EW1 in the width direction (W-axis direction) of the pair of second internal electrode layers 122 may be substantially the same. For example, a ratio of the average length in the width direction (W-axis direction) of the first internal electrode layer 121 to the average length in the width direction (W-axis direction) of the second internal electrode layer 122 may be about 0.8:1 to about 1:0.8, for example about 0.9:1 to about 1:0.9, or about 1:1.

For example, an average length in the width direction (W-axis direction) of one end of the 1-1 internal electrode layer 121*a* connected to the first external electrode 131 may be shorter than an average length in the width direction (W-axis direction) of the other end of the 1-1 internal electrode layer 121*a* not connected to the first external electrode 131. That is, the average length in the width direction (W-axis direction) of one end close to the third surface of the 1-1 internal electrode layer 121*a* may be shorter than the average length in the width direction (W-axis direction) of one end close to the fourth surface. For example, the average length in the width direction (W-axis direction) of the 1-1 internal electrode layer 121*a* is generally constant in the longitudinal direction (L-axis direction), but the average length in the width direction (W-axis direction) from one end of the 1-1 internal electrode layer 121*a* connected to the first external electrode 131 may be gradually decreased.

An average length in the width direction (W-axis direction) of one end of the 1-2 internal electrode layer 121*b* connected to the second external electrode 132 may be shorter than an average length in the width direction (W-axis direction) of the other end of the 1-2 internal electrode layer 121*b* not connected to the second external electrode 132. That is, the average length in the width direction (W-axis direction) of one end close to the fourth surface of the 1-2 internal electrode layer 121*b* may be shorter than the average length in the width direction (W-axis direction) of one end close to the third surface. For example, the average length in the width direction (W-axis direction) of the 1-2 internal electrode layer 121*b* is generally constant in the longitudinal direction (L-axis direction), but the average length in the width direction (W-axis direction) from one end of the 1-2 internal electrode layer 121*b* connected to the second external electrode 132 may be gradually decreased.

Similarly, the average length in the width direction (W-axis direction) of one end of the 2-1 internal electrode layer 122*a* connected to the first external electrode 131 may be shorter than the average length in the width direction (W-axis direction) of the other end of the 2-1 internal electrode layer 122*a* not connected to the first external electrode 131. That is, the average length in the width direction (W-axis direction) of one end close to the third surface of the 2-1 internal electrode layer 122*a* may be shorter than the average length in the width direction (W-axis direction) of one end close to the fourth surface. For example, the average length in the width direction (W-axis direction) of the 2-1 internal electrode layer 122*a* is generally constant in the longitudinal direction (L-axis direction), but the average length in the width direction (W-axis direction) from one end of the 2-1 internal electrode layer 122*a* connected to the first external electrode 131 may be gradually decreased.

The average length in the width direction (W-axis direction) of one end of the 2-2 internal electrode layer 122*b* connected to the second external electrode 132 may be shorter than that in the width direction (W-axis direction) of the other end of the 2-2 internal electrode layer 122*b* not connected to the second external electrode 132. That is, the average length in the width direction (W-axis direction) of one end close to the fourth surface of the 2-2 internal electrode layer 122*b* may be shorter than the average length in the width direction (W-axis direction) of one end close to the third surface. For example, the average length in the width direction (W-axis direction) of the 2-2 internal electrode layer 122*b* is generally constant in the longitudinal direction (L-axis direction), but the average length in the width direction (W-axis direction) from one end of the 2-2 internal electrode layer 122*b* connected to the second external electrode 132 may be gradually decreased.

Accordingly, by reducing the stress at the interface with the external electrode, and alleviating the rapid stress rise at the interface with the external electrode, the crack generation due to the piezoelectric phenomenon is delayed, so that the initial failure may be reduced.

Hereinafter, specific embodiments of the invention are presented. However, the examples described below are only for specifically illustrating or explaining the invention, and the scope of the invention is not limited thereto.

PRODUCTION EXAMPLES: MANUFACTURING OF MULTILAYERED CAPACITOR

Example 1

As shown in FIG. 3, a capacitor body was manufactured by alternately stacking a pair of first internal electrode layers and a pair of second internal electrode layers with a dielectric layer interposed therebetween and herein, by adjusting a margin portion close to the fifth surface of the first internal electrode layer to have an average length of 50 μm, a margin portion close to the sixth surface of the first internal electrode layer to have an average length of 50 μm, a margin portion close to the fifth surface of the second internal electrode layer to have an average length of 117 μm, and a margin portion close to the sixth surface second internal electrode layer to have an average length of 117 μm, obtaining a multilayered capacitor according to Example 1.

Example 2

As shown in FIG. 9, a capacitor body was manufactured by alternately stacking a pair of first internal electrode layers and a pair of second internal electrode layers with a dielectric layer interposed therebetween and herein, by adjusting a margin portion close to the fifth surface of the first internal electrode layer to have an average length of 50 μm, a margin portion close to the sixth surface of the first internal electrode layer to have an average length of 117 μm, a margin portion close to the fifth surface of the second internal electrode layer to have an average length of 117 μm, and a margin portion close to the sixth surface second internal electrode layer to have an average length of 50 μm, obtaining a multilayered capacitor according to Example 2.

Reference Example 1

A capacitor body was manufactured by alternately stacking a first internal electrode layer and a second internal electrode layer with a dielectric layer interposed therebetween and herein, by adjusting a margin portion close to the fifth surface of the first internal electrode layer to have an average length of 50 μm, a margin portion close to the sixth surface of the first internal electrode layer to have an average length of 50 μm, a margin portion close to the fifth surface of the second internal electrode layer to have an average length of 117 μm, and a margin portion close to the sixth surface second internal electrode layer to have an average length of 117 μm, obtaining a multilayered capacitor according to Reference Example 1.

For reference, in the multilayered capacitor of Example 1, one pair of first internal electrode layers and one pair of second internal electrode layers were alternately stacked, but in the multilayered capacitor of Reference Example 1, one first internal electrode layer and one second internal electrode layer were alternately stacked.

Comparative Example 1

A capacitor body was manufactured by alternately stacking only a pair of second internal electrode layers with a dielectric layer interposed therebetween and herein, by adjusting a margin portion close to the fifth surface of the second internal electrode layer to have an average length of 117 μm and a margin portion close to the sixth surface of the second internal electrode layer to have an average length of 117 μm, obtaining a multilayered capacitor according to Comparative Example 1.

Comparative Example 2

A capacitor body was manufactured by alternately stacking only a pair of first internal electrode layers with a dielectric layer interposed therebetween and herein, by adjusting a margin portion close to the fifth surface of the first internal electrode layer to have an average length of 50 μm and a margin portion close to the sixth surface of the first internal electrode layer to have an average length of 50 μm, obtaining a multilayered capacitor according to Comparative Example 2.

Figure 15:
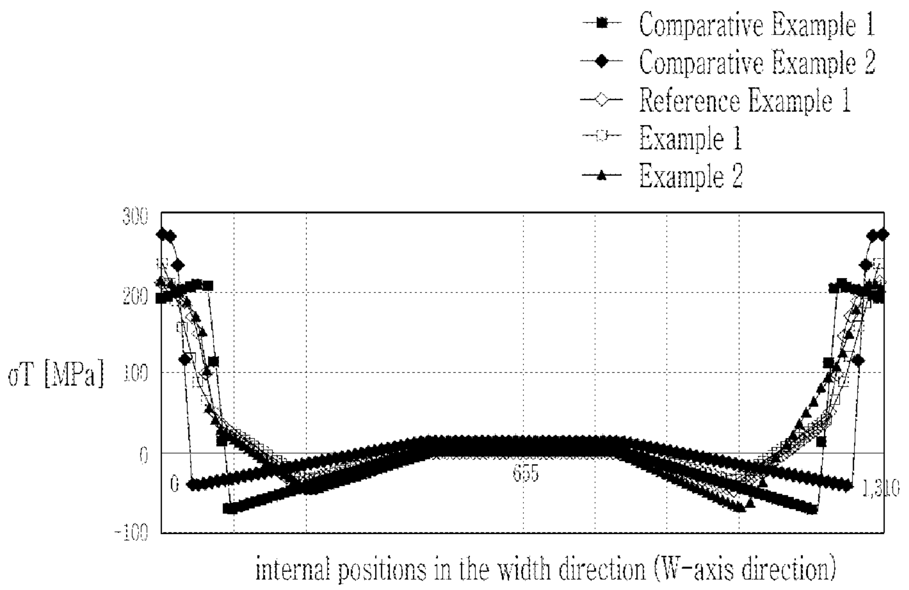
FIG. 15 is a graph illustrating stress distribution according to internal positions in the width direction (W-axis direction)

Experimental Example: Measurement of Stress Distribution of Multilayered Capacitors The multilayered capacitors according to Examples 1 and 2, Comparative Examples 1 and 2, and Reference Example 1 were measured with respect to stress distribution according to internal positions of the multilayered capacitors in the width direction (W-axis direction), and the results are shown in FIG. 15 and provided in Table 1.

The stress distribution according to internal positions of the multilayered capacitors in the width direction (W-axis direction) was simulated by reflecting actual measurements of a product (a thickness of a dielectric layer, a thickness of an internal electrode layer, a length of a margin portion, and the like) during the modeling.

TABLE 1

| Stress | Comparative Example 1 | Comparative Example 2 | Reference Example 1 | Example 1 | Example 2 |
|---|---|---|---|---|---|
| Average value (MPa) | 172 | 208 | 145 | 127 | 127 |
| Average value (relative comparison) | 1 | 1.21 | 0.84 | 0.74 | 0.74 |
| Maximum value (MPa) | 211 | 273 | 212 | 238 | 212 |
| Maximum value (relative comparison) | 1 | 1.29 | 1 | 1.13 | 1 |

Referring to Table 1 and FIG. 15, the multilayered capacitors according to Examples 1 and 2 had average stress lowered from 175 MPa to 127 MPa, compared with the multilayered capacitor according to Comparative Example 1, thereby, improving cracks due to a piezoelectric phenomenon.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising:

a capacitor body including:

dielectric layers;

internal electrode layers consisting of:

a plurality of a pair of first internal electrode layers with a first one of the dielectric layers interposed therebetween; and a plurality of a pair of second internal electrode layers stacked with a second one of the dielectric layers interposed therebetween;

an active region in which the pair of first internal electrode layers and the pair of second internal electrode layers are stacked and overlapped with each other along a thickness direction, two cover regions respectively disposed on a top and bottom of the active region in the thickness direction, a first external electrode and a second external electrode on both sides of the capacitor body in a longitudinal direction of the capacitor body, wherein one of the pair of first internal electrode layers connected to the first external electrode and the other of the pair of first internal electrode layers is connected to the second external electrode, and one of the pair of second internal electrode layers connected to the first external electrode, and the other of the pair of second internal electrode layers is connected to the second external electrode, the plurality of the pair of first internal electrode layers and the plurality of the pair of second internal electrode layers are alternately stacked with a third one of the dielectric layers interposed therebetween, at least one of the plurality of the pair of first internal electrode layers are placed closer to the cover portions than at least one of the plurality of the pair of second internal electrode layers, the pair of first internal electrode layers include a 1-1 internal electrode layer connected to the first external electrode and a 1-2 internal electrode layer connected to the second external electrode, the pair of second internal electrode layers include a 2-1 internal electrode layer connected to the first external electrode and a 2-2 internal electrode layer connected to the second external electrode, the 1-1 internal electrode layer, the 1-2 internal electrode layer, the 2-1 internal electrode layer, and the 2-2 internal electrode layer are sequentially stacked with a respective one of the dielectric layers interposed therebetween, and each of the pair of first internal electrode layers has an average length in a width direction of EW1, each of the pair of second internal electrode layers has an average length in the width direction of EW2, and EW1 is longer than EW2.

2. The multilayered capacitor of claim 1, wherein the capacitor body includes a first surface and a second surface facing each other in a stacking direction of the plurality of the pair of first internal electrode layers and the plurality of the pair of second internal electrode layers; a third surface and a fourth surface connected to the first surface and second surface and facing each other in the longitudinal direction; and a fifth surface and a sixth surface connected to the first surface and the second surface, connected to the third surface and the fourth surface, and facing each other in the width direction, the first external electrode is disposed on the third surface of the capacitor body, and the second external electrode is disposed on the fourth surface of the capacitor body.

3. The multilayered capacitor of claim 2, wherein an end portion closer to the fifth surface of the plurality of the pair of first internal electrode layers is closer to the fifth surface than an end portion closer to the fifth surface of the plurality of the pair of second internal electrode layers, and an end portion closer to the sixth surface of the pair of first internal electrode layers is closer to the sixth surface than an end portion closer to the sixth surface of the pair of second internal electrode layers.

4. The multilayered capacitor of claim 3, wherein an average shortest distance from an end closer to the fifth surface to the fifth surface of the plurality of the pair of first internal electrode layers is smaller than an average shortest distance from an end closer to the fifth surface to the fifth surface of the plurality of the pair of second internal electrode layers.

5. The multilayered capacitor of claim 4, wherein an average shortest distance from an end closer to the sixth surface to the sixth surface of the plurality of the pair of first internal electrode layers is smaller than an average shortest distance from an end closer to the sixth surface to the sixth surface of the plurality of the pair of second internal electrode layers.

6. The multilayered capacitor of claim 1, wherein a ratio of the average length in the width direction of the first internal electrode layers to the average length in the width direction of the second internal electrode layers is about 0.7:1 to less than about 1:1.

7. The multilayered capacitor of claim 1, wherein an average length in the width direction of one end of the 1-1 internal electrode layer connected to the first external electrode is shorter than an average length in the width direction of the other end of the 1-1 internal electrode layer not connected to the first external electrode, an average length in the width direction of one end of the 1-2 internal electrode layer connected to the second external electrode is shorter than an average length in the width direction of the other end of the 1-2 internal electrode layer not connected to the second external electrode, an average length in the width direction of one end of the 2-1 internal electrode layer connected to the first external electrode is shorter than an average length in the width direction of the other end of the 2-1 internal electrode layer not connected to the first external electrode, and an average length in the width direction of one end of the 2-2 internal electrode layer connected to the second external electrode is shorter than an average length in the width direction of the other end of the 2-2 internal electrode layer not connected to the second external electrode.

* * * * *